United States Patent
Lambert et al.

(10) Patent No.: US 9,976,591 B2
(45) Date of Patent: May 22, 2018

(54) BOLT AND CAP ASSEMBLY FOR PLUMBING FIXTURE

(71) Applicant: Kohler Co., Kohler, WI (US)

(72) Inventors: Tony L. Lambert, Sheboygan, WI (US); Daniel N. Halloran, Saukville, WI (US); Jonathan R. Guay, Cary, IL (US); Randy O. Mesun, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 155 days.

(21) Appl. No.: 14/608,447

(22) Filed: Jan. 29, 2015

(65) Prior Publication Data

US 2015/0219145 A1 Aug. 6, 2015

Related U.S. Application Data

(60) Provisional application No. 61/934,460, filed on Jan. 31, 2014.

(51) Int. Cl.
*F16B 37/14* (2006.01)
*F16B 43/00* (2006.01)
*E03D 11/16* (2006.01)
*F16B 33/00* (2006.01)

(52) U.S. Cl.
CPC ............ *F16B 43/001* (2013.01); *E03D 11/16* (2013.01); *F16B 33/002* (2013.01); *F16B 37/14* (2013.01)

(58) Field of Classification Search
CPC ........... F16B 37/14; E03D 11/16; E03D 11/17
USPC ........... 411/372.5, 372.6, 373, 377, 431, 388
See application file for complete search history.

(56) References Cited

U.S. PATENT DOCUMENTS

| | | | |
|---|---|---|---|
| 1,994,978 A * | 3/1935 | Brown | A47G 3/00 16/220 |
| 2,837,750 A | 1/1954 | Robinson | |
| 3,180,660 A | 4/1965 | Brewington | |
| 3,181,585 A | 5/1965 | Brewington | |
| 3,241,427 A | 3/1966 | Bosler | |
| 3,485,134 A | 12/1969 | Ott | |
| 3,881,391 A * | 5/1975 | Dereszynski | F16B 37/14 411/368 |
| 3,905,052 A | 9/1975 | DeAngelis | |
| 3,921,229 A | 11/1975 | Yavitch | |
| 3,930,432 A * | 1/1976 | Puchy | F16B 37/14 411/376 |

(Continued)

OTHER PUBLICATIONS

Gordon's Ace Hdwr; Toilet Bolts Flushmount; Sep. 24, 2014; 1 page.

*Primary Examiner* — Flemming Saether
(74) *Attorney, Agent, or Firm* — Foley & Lardner LLP (57) ABSTRACT

A bolt and cap assembly for mounting a plumbing fixture includes a flanged nut, a bolt, a washer, and a cap. The flanged nut includes a flange and a sleeve extending therefrom. The bolt includes a substantially planar head and a shaft extending therefrom. The shaft is configured to threadably engage the flanged nut to couple the plumbing fixture to a mounting flange. The washer is configured to be positioned between the bolt and the flanged nut. The cap is configured to be removably coupled to the washer and to encase the substantially planar head of the bolt between the washer and the cap so as to conceal the substantially planar head from view and to prevent fluid from entering an area between the cap and the washer.

16 Claims, 4 Drawing Sheets

(56) References Cited

U.S. PATENT DOCUMENTS

| | | | |
|---|---|---|---|
| 4,033,243 A | 7/1977 | Kirrish et al. | |
| 4,227,722 A | 10/1980 | Barber | |
| 4,574,402 A | 3/1986 | Brown | |
| 4,601,624 A * | 7/1986 | Hill | F16B 37/14 411/373 |
| 4,907,301 A * | 3/1990 | Tucker | E03D 11/16 285/56 |
| 5,068,956 A * | 12/1991 | Malewicz | A63C 17/0073 280/11.27 |
| 5,222,851 A * | 6/1993 | Dickerson | F16B 35/06 4/252.1 |
| 5,421,036 A | 6/1995 | Stevens | |
| 5,653,564 A * | 8/1997 | Nakamura | F16B 37/14 411/373 |
| 6,125,479 A | 10/2000 | Fraleigh | |
| 6,254,141 B1 | 7/2001 | Piper | |
| 6,397,405 B1 | 6/2002 | Grech et al. | |
| 6,584,623 B2 | 7/2003 | Grech et al. | |
| 6,698,986 B2 | 3/2004 | Fraleigh | |
| 6,871,361 B2 | 3/2005 | Grech et al. | |
| 8,210,785 B1 | 7/2012 | Gager | |
| 2010/0300035 A1 * | 12/2010 | Pither | F16B 37/14 52/745.21 |
| 2013/0108392 A1 | 5/2013 | Henriksen, Jr. | |
| 2013/0333105 A1 * | 12/2013 | Monat | E03D 11/16 4/252.4 |
| 2015/0322662 A1 * | 11/2015 | Schuster | F16B 35/00 29/890.141 |

* cited by examiner

BOLT AND CAP ASSEMBLY FOR PLUMBING FIXTURE

CROSS-REFERENCE TO RELATED PATENT APPLICATIONS

This application claims the benefit of and priority to U.S. Provisional Patent Application No. 61/934,460, filed on Jan. 31, 2014, the entire disclosure of which is incorporated by reference herein.

BACKGROUND

The present disclosure relates generally to fasteners, and more specifically, to a bolt and cap assembly for mounting a plumbing fixture, such as a bidet or a toilet.

Generally speaking, a plumbing fixture assembly includes one or more fasteners for coupling a plumbing fixture to a fixed structure, such as a floor in a bathroom. Most conventional fasteners include threaded rods/studs or bolts that extend up from a mounting flange, which is typically coupled to the floor and/or a drain pipe within an opening of the floor. The threaded rods or bolts extend upward from the flange a distance that is sufficient to account for variations in floor thickness, such that the rods/bolts can be used to install plumbing fixtures on various types of floors having different thicknesses. The plumbing fixture generally includes a base having one or more through holes designed to receive the threaded rods/bolts therethrough to couple the plumbing fixture relative to the floor/drain pipe. The rods/bolts can extend up through the holes to receive a nut and washer to secure the plumbing fixture to the mounting flange.

However, in many applications, the threaded rods/bolts extend a significant distance above the base of the plumbing fixture, due to the length of the threaded rod/bolt to account for variations in floor thickness. Thus, a user or an installer is usually required to cut the excess length of the rod/bolt after securing the plumbing fixture to the floor (i.e., after threading the nut onto the rod/bolt), such that a decorative cap can be installed over the nut/washer. Once the excess rod/bolt is cut, a decorative cap having a height sufficient to cover the threaded rod/bolt and nut/washer is typically installed thereon. The cap usually protrudes a significant distance above the base (e.g., 1" inch or more) to cover the nut/washer, which can be unsightly and can interfere with, for example, a user or an installer trying to clean around the plumbing fixture base.

Accordingly, it would be advantageous to provide a bolt and cap assembly for mounting a plumbing fixture that can account for variations in floor thickness without having to perform secondary operations (such as cutting), allows for easier accessibility for cleaning at or around the plumbing fixture, and is aesthetically pleasing. These and other advantageous features will become apparent to those reviewing the present disclosure and claims.

SUMMARY

One embodiment relates to a plumbing fixture assembly. The plumbing fixture assembly includes a plumbing fixture, a mounting flange, and a bolt and cap assembly. The plumbing fixture includes a base having a through hole disposed therein. The mounting flange includes a slot and is configured to be coupled within an opening of a floor and to fluidly couple the plumbing fixture to a drain pipe. The bolt and cap assembly is configured to couple the plumbing fixture to the mounting flange. The bolt and cap assembly includes a flanged nut, a bolt, a washer, and a cap. The flanged nut includes a sleeve and a flange, and is configured for insertion into the slot of the mounting flange such that the flanged nut is fixed both rotationally and in a longitudinal direction. The bolt includes a substantially planar head and a shaft, and is configured to be inserted into the through hole of the base and to threadably engage the flanged nut to couple the plumbing fixture to the mounting flange. The washer is configured to be disposed between the substantially planar head and an upper surface of the base. The cap is configured to be removably coupled to the washer and to encase the substantially planar head between the washer and the cap so as to conceal the substantially planar head from view and to prevent fluid from entering an area between the cap and the washer.

Another embodiment relates to a bolt and cap assembly for mounting a plumbing fixture. The bolt and cap assembly includes a flanged nut, a bolt, a washer, and a cap. The flanged nut includes a flange and a sleeve extending therefrom. The bolt includes a substantially planar head and a shaft extending therefrom. The shaft is configured to threadably engage the flanged nut to couple the plumbing fixture to a mounting flange. The washer is configured to be positioned between the bolt and the flanged nut. The cap is configured to be removably coupled to the washer and to encase the substantially planar head of the bolt between the washer and the cap so as to conceal the substantially planar head from view and to prevent fluid from entering an area between the cap and the washer.

Yet another embodiment relates to another bolt and cap assembly for mounting a plumbing fixture. The bolt and cap assembly includes a flanged nut, a bolt, a washer, and a cap. The flanged nut is configured to be inserted and retained within a mounting flange. The mounting flange is configured to be coupled within an opening of a floor. The bolt includes a substantially planar head and a shaft extending therefrom and is configured to threadably engage the flanged nut to couple a plumbing fixture to the mounting flange. The washer is configured to receive the substantially planar head of the bolt with the shaft extending therethrough. The cap is configured to be removably coupled to the washer with the substantially planar head of the bolt encased therebetween. The plumbing fixture is positioned adjacent the mounting flange defining a space therebetween for receiving a portion of the floor. The bolt is selectively adjustable relative to the flanged nut to account for variations in floor thickness and to securely couple the plumbing fixture to the mounting flange.

DETAILED DESCRIPTION

Referring generally to the FIGURES, disclosed herein are plumbing fixture assemblies including a bolt and cap assembly (also referred to as a fastener assembly) for mounting the plumbing fixture. The bolt and cap assembly is configured to account for variations in floor thickness without having to perform secondary operations to the assembly (such as cutting of the bolt), allows for easier accessibility for cleaning at or around the plumbing fixture, and has a low-profile, smooth appearance that is aesthetically pleasing.

Generally speaking, a conventional fastener assembly for mounting a plumbing fixture (e.g., a toilet, a bidet, etc.) can include one or more flanged bolts (i.e., "T-bolts") installed in a mounting flange, which is in turn coupled to a pipe (e.g., a sewer or drain pipe) located in an opening of a floor. Typically, the mounting flange includes one or more slots that are configured to retain the flanged bolt such that a threaded portion of the bolt extends up from the mounting flange to receive a plumbing fixture thereon (e.g., a toilet, a bidet, or the like). The plumbing fixture generally includes a base portion that has at least one through-hole for mounting the plumbing fixture to the mounting flange. Typically, the base portion is configured to be installed on the mounting flange with the threaded portion of the bolt extending through the through-hole located on the plumbing fixture base. A portion of the floor is then sandwiched between the plumbing fixture and the ground when the plumbing fixture is installed onto the mounting flange. Once the plumbing fixture is installed onto the mounting flange, a nut is usually coupled onto the threaded portion of the bolt to secure the plumbing fixture to the mounting flange and the floor. Finally, a decorative cap is typically installed over the nut/bolt assembly to conceal the nut/bolt from view.

However, before the decorative cap can be installed, the threaded portion of the bolt must usually be cut/trimmed because the threaded portion of the bolt typically extends a substantial distance above the base portion of the plumbing fixture (e.g., 1-4" (inches) or more) to account for variations in floor thickness. For example, if the plumbing fixture is installed onto a floor having a small thickness (e.g., less than 0.5" (inch)), the height between a top surface of the plumbing fixture base and the mounting flange will be less than the height if the plumbing fixture was installed onto a floor having a larger thickness (e.g., 0.5" (inch) or more). Thus, depending on the floor thickness, more or less of the threaded portion of the bolt will be exposed above the top surface of the plumbing fixture base. Once the nut is installed onto the threaded portion of the bolt to couple the plumbing fixture to the mounting flange, there is usually an exposed threaded portion of the bolt that extends beyond the top of the nut (e.g., 1" (inch) or more, depending on the floor thickness). This is undesirable because the decorative cap cannot be installed over the nut/bolt without first cutting/removing the exposed threaded portion of the bolt.

Moreover, even when the additional threaded portion of the bolt is cut/removed, the decorative cap is typically configured to protrude a distance (e.g., 1" (inch) or more) above the plumbing fixture base to account for the nut/bolt thickness and to completely hide/conceal the nut/bolt assembly. This is both unsightly and undesirable. For instance, the protruding cap can be difficult to clean around and can get in the way of a user trying to access the area between the cap and the plumbing fixture because the protruding cap can cause snagging of clothes, hands, and the like. Additionally, conventional decorative cap and nut configurations are not ideal because water/dirt can settle between the cap and a portion of the plumbing fixture base due to, for example, difficulty in accessing the area between the cap and the plumbing fixture base during cleaning. This can result in a buildup of mold around the bolt/cap and/or can cause corrosion around the bolt/cap, which can ultimately reduce the service life of the bolt and cap assembly.

Figure 1:
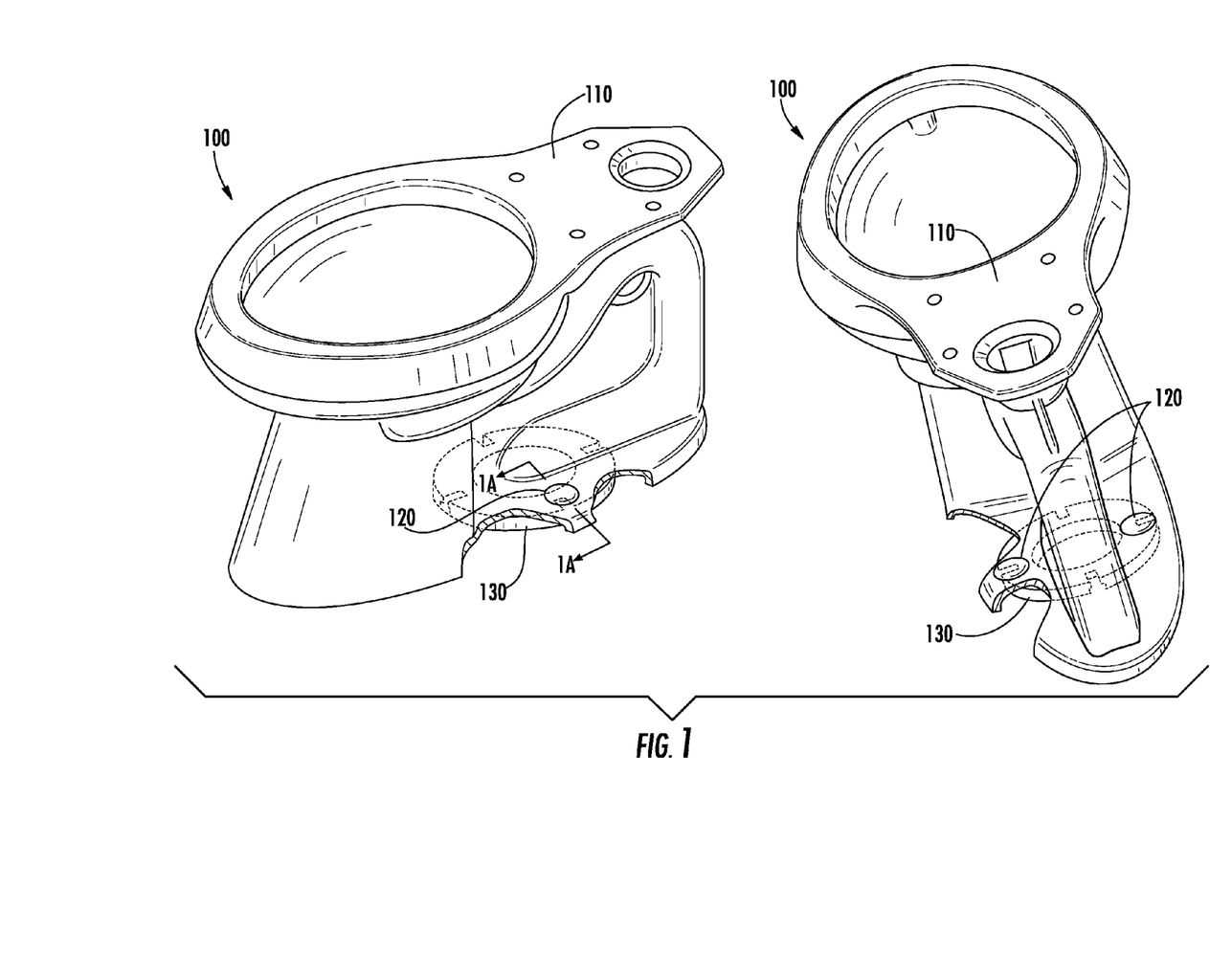
FIG. 1 is a perspective view of a plumbing fixture assembly, according to an exemplary embodiment.

Referring now to FIG. 1, according to an exemplary embodiment, a plumbing fixture assembly 100 includes one or more bolt and cap assemblies 120 for mounting a plumbing fixture 110 (e.g., a toilet or a bidet) to a mounting flange 130. The mounting flange 130 has a generally circular shape, although other shapes are possible such as square, oval, etc., according to other exemplary embodiments. The mounting flange 130 is configured to be mounted to the ground in an opening of a floor, such as floor 200 shown in FIG. 3. According to various exemplary embodiments, the floor 200 can be tile, carpet, wood, or the like. The mounting flange 130 includes a centrally located opening that is configured to be in fluidic communication with both the plumbing fixture 110 and a waste pipe or a sewer drain (not shown) disposed within the opening of the floor 200 (for example, see FIG. 3).

Figure 1A:
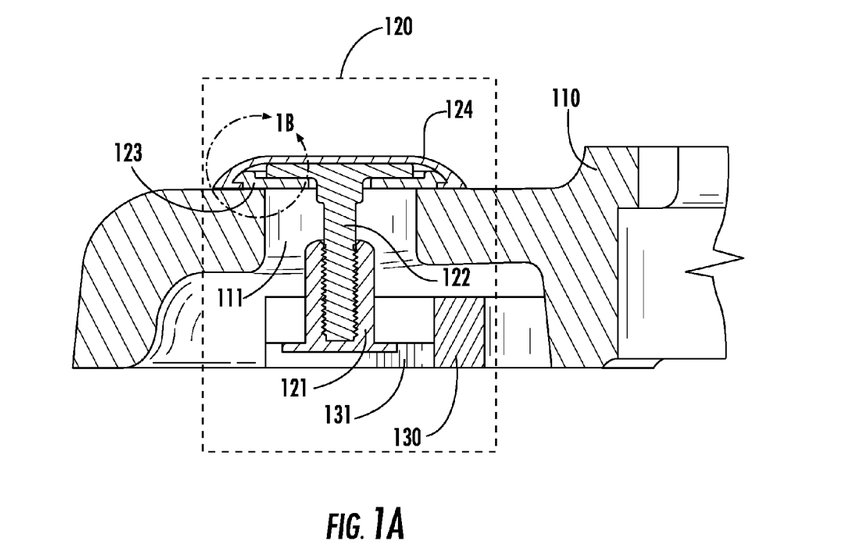
FIG. 1A is a cross-section view of the plumbing fixture assembly of FIG. 1.
Figure 3:
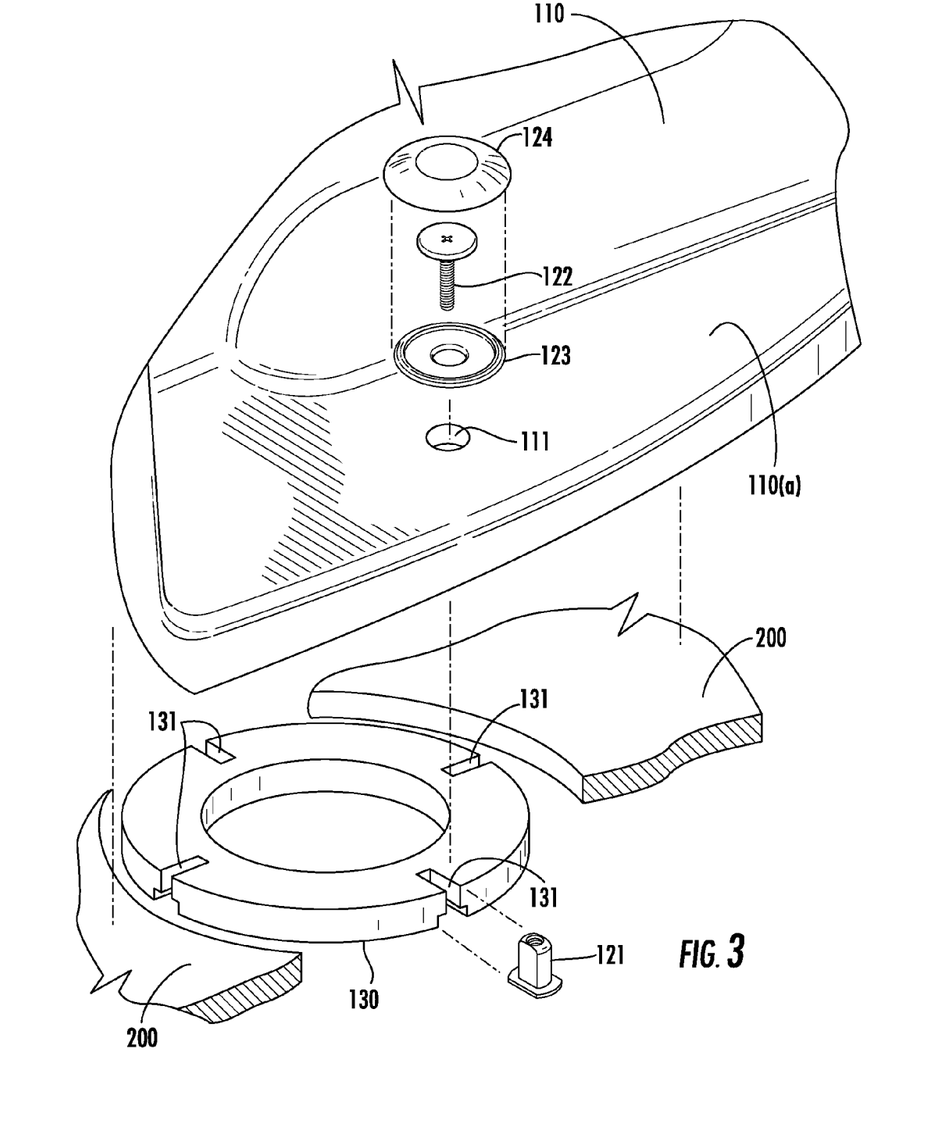
FIG. 3 is an exploded view of an exemplary installation of the plumbing fixture assembly of FIG. 1.

Referring to FIGS. 1A and 3, the mounting flange 130 also includes one or more slots 131 disposed circumferentially around the opening of the mounting flange 130. Each slot 131 extends radially inward from a circumferential edge of the mounting flange 130. The slots 131 are configured to retain a flanged nut 121 (e.g., a "T-nut") installed therein, such that the flanged nut 121 is fixed rotationally and fixed in a longitudinal direction within the mounting flange 130. The mounting flange 130 also includes multiple mounting points (not shown) (e.g., through-holes, threaded studs, etc.) located around the opening of the flange for installing/coupling the mounting flange 130 within an opening of the floor and/or to the waste pipe or sewer drain.

According to the exemplary embodiment shown in FIGS. 1A-3, the bolt and cap assembly 120 is configured to removably couple the plumbing fixture 110 to the mounting flange 130. The bolt and cap assembly 120 includes a flanged nut (e.g., a "T-nut") 121 having a flange 121a at a first end and a sleeve 121b at a second end extending therefrom. The sleeve 121b has an internal bore 121c which extends a length through the nut 121. The internal bore 121c includes a threaded portion that extends the entire length of the internal bore 121c to account for variations in floor thickness when installing the plumbing fixture 110. According to other exemplary embodiments, the threaded portion extends a portion of the length of internal bore 121c. According to an exemplary embodiment, internal bore 121c extends a minimum distance of about ½" (inch) through the sleeve 121b. The flange 121a is configured to be inserted within a slot 131 of mounting flange 130 such that the nut 121 is retained within the slot 131. The flanged nut 121 is configured to move laterally in a radial direction within the slot 131. However, the flanged nut 121 is rotationally fixed within the slot 131. According to other exemplary embodiments (not shown), the flanged nut 121 can be integrally formed with the mounting flange 130 (e.g., using welds, bonds, etc.). The flanged nut 121 can be made out of various rigid materials or combinations of rigid materials such as steel, brass, nylon, or the like.

According to an exemplary embodiment, the bolt and cap assembly 120 further includes a bolt 122 configured to be removably (e.g., threadably) coupled to the flanged nut 121 to couple the plumbing fixture 110 to the mounting flange 130. The bolt 122 includes a substantially planar head 122a at a first end of the bolt and a shaft 122b extending from the head 122a at a second end of the bolt 122. According to an exemplary embodiment, the substantially planar head 122a has a thickness of about 0.10" (inches), although the head 122a can have a different thickness according to other exemplary embodiments. The substantially planar head 122a includes a drive portion disposed within a top surface thereof. The drive portion is configured to receive a portion of a screwdriver, a drill, or the like, to drive the bolt 122 into threaded engagement with the flanged nut 121. According to an exemplary embodiment, the drive portion is a slotted cross-drive (i.e., a Philips drive). According to other exemplary embodiments, the drive portion is a hex head, a torx drive, a flat-head drive, or other similar drive configuration. The shaft 122b extends from a bottom surface of the substantially planar head 122a and can have various lengths depending on the particular application of the bolt 122. The shaft 122b includes an external thread that extends a substantial portion, or all, of the length of the shaft 122b. The external thread is configured to threadably engage the internal thread of the flanged nut 121 to couple the plumbing fixture 110 to the mounting flange 130. The bolt 122 can be made out of various rigid materials or combinations of rigid materials such as steel, brass, nylon, plastic, or the like.

According to an exemplary embodiment, the bolt and cap assembly 120 further includes a washer 123 configured to be installed over the shaft 122b of the bolt 122, such that the washer 123 is sandwiched between a bottom surface of the substantially planar head 122a and a top surface of the plumbing fixture base 110a when the bolt and cap assembly 120 is installed therein. The washer 123 has an outer diameter that is larger than an inner diameter of a mounting hole 111 (i.e., a through-hole) disposed within the plumbing fixture base 110a, such that a portion of the washer 123 can engage the base 110a. According to another exemplary embodiment (not shown), the hole 111 includes a counterbore configured to receive the washer 123 therein, such that an upper portion of the washer 123 is coplanar with the plumbing fixture base 110a.

According to an exemplary embodiment, the washer 123 includes an internal recess 123a configured to receive the substantially planar head 122a of the bolt 122. The internal recess 123a is defined by a mounting feature 123b located along a peripheral edge of the washer 123. According to an exemplary embodiment, the mounting feature 123b is a continuous circumferential ridge or lip that substantially surrounds the perimeter of the washer 123. According to an exemplary embodiment, the washer 123 has a thickness of about 0.08" (inches), but can be configured to have a different thickness according to other exemplary embodiments. The washer 123 can be made out of various materials or combinations of materials such as rubber, nylon, plastic, metal, or the like.

According to other exemplary embodiments (not shown), the mounting feature 123b can include a plurality of circumferential ridges or lips. According to other exemplary embodiments (not shown), the mounting feature 123b can include threads, snap features, press fit features, or the like. According to other exemplary embodiments (not shown), the mounting feature 123b can be located at a different location on the washer 123 such as, for example, along an inside edge of the washer 123 or within the recess 123a. According to other exemplary embodiments (not shown), the washer 123 and the substantially planar head 122a of the bolt 122 can be integrally formed as a single unitary structure.

Figure 1B:
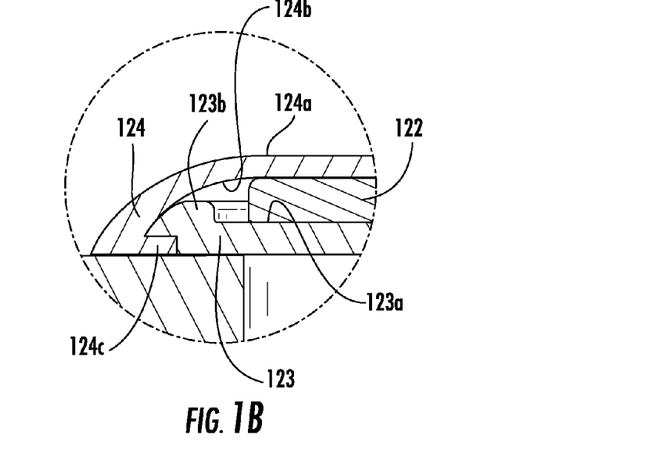
FIG. 1B is a detail view of the plumbing fixture assembly of FIG. 1A.
Figure 2:
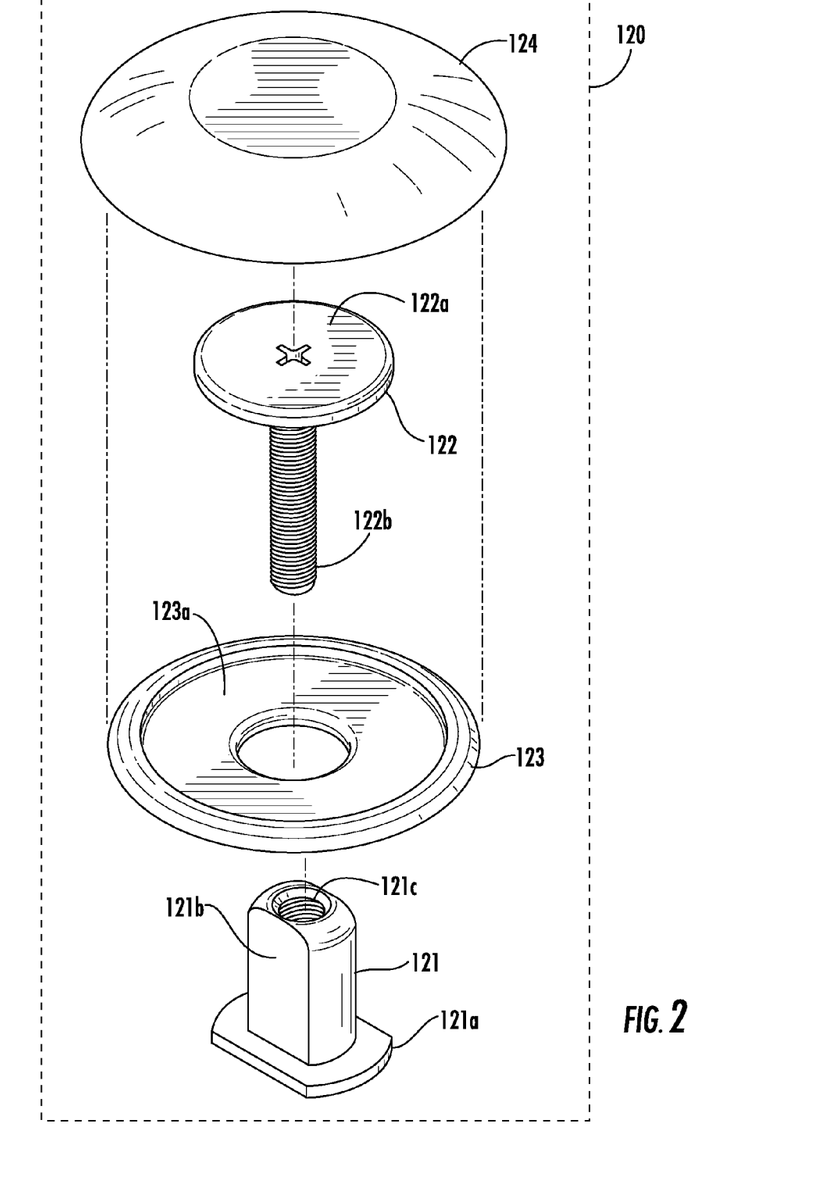
FIG. 2 is an exploded view of the bolt and cap assembly of FIG. 1.

According to an exemplary embodiment, the bolt and cap assembly 120 further includes a cap 124 configured to be removably coupled to the washer 123 and to conceal/hide the substantially planar head 122a of the bolt 122. The cap 124 can have different shapes, such as circular, oval, square, or the like. According to an exemplary embodiment, the cap 124 has a substantially planar top surface 124a and a bottom surface 124b located below the top surface 124a. The bottom surface 124b defines a cavity of the cap 124. According to an exemplary embodiment, the top surface 124a has a surface profile that is similar or substantially the same as a surface profile of the upper surface of the plumbing fixture base 110a (e.g., curved, planar, etc.), so as to create a smooth, blended appearance when the bolt and cap assembly 120 is installed in the plumbing fixture assembly 100. In this way, the cap 124 provides for better aesthetics by concealing the bolt and cap assembly 120 relative to the base 110a of the plumbing fixture 110.

According to the exemplary embodiment shown in FIG. 1B, the cavity defined by the bottom surface 124b has a height sufficient to receive a portion of the washer 123 and the substantially planar head 122a of the bolt 122 therein. For example, referring to FIG. 1A, when the cap 124 is coupled to the washer 123 with the bolt 122 installed therebetween, the bottom surface 124b of the cap 124 is flush with a top surface of the substantially planar head 122a. According to other exemplary embodiments (not shown), there is a small gap (e.g., 0 to 0.10" (inches)) between the bottom surface 124b and the top surface of the substantially planar head 122a. This flush arrangement between the bottom surface 124b and the top surface of the substantially planar head 122a provides for a low-profile assembly that is easy for a user to maneuver around while cleaning and/or working on the plumbing fixture 110. Additionally, the low-profile appearance is aesthetically pleasing because the bolt and cap assembly 120 does not protrude a large distance above the plumbing fixture base 110a.

According to an exemplary embodiment, the cap 124 also includes a mating edge 124c located on an inside portion of the cap 124. The mating edge 124c is configured to engage the mounting feature 123b of the washer 123 to removably couple the cap 124 to the washer 123. According to an exemplary embodiment, the mating edge 124c has a profile that is complementary to the profile of the mounting feature 123b such that the cap 124 is retained by the washer 123 when the cap is installed thereto. For example, as shown in FIG. 1B, the bottom surface 124b of the cap 124 includes a planar portion and a perimeter portion, where the perimeter portion is complementary to a beveled surface of the mounting feature 123b, and the mating edge 124c of the cap is complementary to a planar surface of the mounting feature 123b. The mating edge 124c surrounds a perimeter of the cap 124 to seal off the internal cavity defined by the bottom surface 124b from exposure to contaminants (e.g., fluids, etc.) when installed onto the washer 123 with the bolt 122 positioned therebetween. According to other exemplary embodiments, the cap 124 can be removably coupled to the washer 123 using other features or combinations of features such as threads, press fit features, snap features, or the like. The washer 123 and cap 124 combination substantially conceals/hides the substantially planar head 122a of the bolt 122 from exposure to contaminants (e.g., moisture, dirt, etc.) by completely or substantially encasing the substantially planar head 122a. This configuration reduces the likelihood of a buildup of contaminants around the bolt 122, because dirt and moisture is unable to enter the area between the cap 124 and the washer 123 where the bolt 122 is positioned.

According to an exemplary installation shown in FIG. 3, the mounting flange 130 is coupled to a pipe (e.g., a sewer or drain pipe) located within an opening of the floor 200 using one or more fasteners such as bolts, nuts, threaded studs, or the like (not shown). One or more flanged nuts 121 are installed (e.g., inserted, etc.) into respective slots 131 of the mounting flange 130, such that the sleeve 121*a* of each nut 121 extends up from the mounting flange 130, but is retained within the slot 131 rotationally and in a longitudinal direction. The plumbing fixture 110 (e.g., toilet or bidet) having a base 110*a* with one or more through holes 111 disposed therein, can be positioned onto the mounting flange 130 such that an upright axis of the one or more through holes 111 is aligned with an upright axis of the one or more flanged nuts 121, respectively. The base 110*a* of the plumbing fixture 110 will contact a portion of the floor (e.g., tile, carpet, wood, laminate, etc.) at a bottom surface of the base 110*a* once the plumbing fixture 110 is positioned onto the mounting flange 130. The threaded end 122*b* of the bolt 122 can be inserted through the washer 123, such that a bottom surface of the substantially planar head 122*a* contacts the recess 123*a* of the washer 123. The bolt 122 with the washer 123 installed thereon (i.e., with the shaft 122*b* extending through the washer 123) can be inserted into a through hole 111 such that the threaded portion of the shaft 122*b* threadably engages the internal bore 121*c* of the sleeve 121*b* to couple the plumbing fixture 110 to the mounting flange 130. The washer 123 is sandwiched between the substantially planar head 122*a* and the top surface of the plumbing fixture base 110*a*.

According to various exemplary embodiments, the bolt 122 can be adjusted relative to the sleeve 121*b* of the flanged nut 121 to account for variations in floor thickness and to maintain a secure mounting of the plumbing fixture 110. For example, if the plumbing fixture 110 is installed onto a floor, such as floor 200 shown in FIG. 3, having a large thickness (e.g., greater than ½" (inch)), the bolt 122 can be threaded a distance (e.g., ½" (inch) or less) into the sleeve 121*b* of the flanged nut 121 to account for the large floor thickness, and to securely couple the plumbing fixture 110 to the mounting flange 130 with the floor 200 disposed therebetween. By contrast, if the plumbing fixture 110 is installed onto a floor having a smaller thickness (e.g., ½" (inch) or less), the bolt 122 can be threaded a greater distance (e.g., more than ½" (inch)) into the sleeve 121*b* of the flanged nut 121, to account for the smaller thickness of the floor. That is to say, the sleeve 121*b* of the flanged nut 121 and the bolt 122 can account for variations in floor thickness, thereby minimizing the need for having to use different length bolts or for performing secondary operations, such as cutting bolts or studs extending up from a mounting flange.

Referring to the exemplary installation shown in FIG. 3, once the bolt 122 has been threaded into the flanged nut 121 a sufficient amount to securely couple the plumbing fixture 110 to the mounting flange 130 with a portion of the floor 200 disposed therebetween, a cap 124 can be removably coupled (e.g., snapped, threaded, press fit, etc.) to the washer 123 to conceal (e.g., hide, encase, etc.) the substantially planar head 122*a* of the bolt 122. According to an exemplary embodiment, the substantially planar head 122*a* is completely encased by the washer 123 and the cap 124 so as to prevent contaminants such as water, dirt, mold, and the like from entering the space between the bottom surface 124*a* and the recess 123*a*. According to an exemplary embodiment, a bottom peripheral edge of the cap 124 can contact a top surface of the plumbing fixture base 110*a* to further conceal both the washer 123 and the bolt 122 when the cap 124 is coupled to the washer 123.

The installed bolt and cap assembly 120 has a low-profile footprint on the plumbing fixture base 110*a*, which allows for easy and safe access for cleaning the area between the bolt and cap assembly 120 and/or other portions of the plumbing fixture 110. Furthermore, water and other contaminants cannot gather in the area between the bolt and cap assembly (i.e., between the cap 124 and the washer 123) and the plumbing fixture 110. In this way, the bolt and cap assembly 120 can have a prolonged service life without the need for changing or repairing components such as bolts, caps, and washers. In addition, the bolt and cap assembly 120 provides for improved aesthetics, because of its low-profile, accessible arrangement.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the plumbing fixture assembly as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., bolt, cap, washer, flanged nut, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A plumbing fixture assembly, comprising:
    a plumbing fixture including a base having a through hole disposed therein;
    a mounting flange including a slot and configured to be coupled within an opening of a floor; and
    a bolt and cap assembly configured to couple the plumbing fixture to the mounting flange, the bolt and cap assembly comprising:
        a flanged nut including a sleeve and a flange and configured for insertion into the slot of the mounting flange such that the flanged nut is fixed both rotationally and in a longitudinal direction;
        a bolt including a substantially planar head and a shaft and configured to be inserted into the through hole of the base and to threadably engage the flanged nut to couple the plumbing fixture to the mounting flange;
        a washer configured to be disposed between the substantially planar head and an upper surface of the base, wherein the washer includes a continuous circumferential ridge extending along the entire perimeter of the washer and defining an internal recess configured to receive the substantially planar head of the bolt; and
        a cap configured to be removably coupled to the washer and to encase the substantially planar head between the washer and the cap so as to conceal the substantially planar head from view and to prevent fluid from entering an area between the cap and the washer, wherein the cap includes a cavity defined by a bottom surface and a mating edge, the bottom surface including a planar portion and a perimeter portion, and the mating edge extends along the entire perimeter of the cap and is configured to selectively engage the continuous circumferential ridge of the washer to removably couple the cap to the washer;
    wherein the continuous circumferential ridge includes an outer beveled surface that is complementary to the perimeter portion of the bottom surface, and wherein the continuous circumferential ridge includes a planar surface that is complementary to the mating edge of the cap;
    wherein the mating edge of the cap extends laterally inward toward a center of the cap so as to overlap with the planar surface of the continuous circumferential ridge; and
    wherein the cap is free from the bolt.

2. The assembly of claim 1, wherein the slot of the mounting flange extends radially inward from a circumferential edge of the mounting flange.

3. The assembly of claim 1, wherein the sleeve of the flanged nut extends upward from the mounting flange and includes a threaded bore, and wherein the shaft includes a threaded portion configured to threadably engage at least a portion of the threaded bore to couple the plumbing fixture to the mounting flange.

4. The assembly of claim 1, wherein the washer is disposed on an upper surface of the base, and wherein the cap is removably coupled to the washer with a bottom edge of the cap positioned adjacent the upper surface of the base, such that the washer and the substantially planar head of the bolt are concealed from view.

5. The assembly of claim 1, wherein the substantially planar head of the bolt is configured to be encased between the bottom surface of the cap and the recess of the washer to prevent fluid from entering therebetween.

6. The assembly of claim 1, wherein the cap includes an upper surface having a surface profile that is substantially the same as a surface profile of the top surface of the plumbing fixture base so as to provide a smooth, blended appearance.

7. The assembly of claim 1, wherein the plumbing fixture is one of a toilet or a bidet.

8. The bolt and cap assembly of claim 1, wherein the substantially planar head has a thickness of about 0.10 inches, wherein the washer has a thickness of about 0.08 inches, and wherein the cap is spaced apart from the substantially planar head by up to 0.10 inches.

9. A bolt and cap assembly for mounting a plumbing fixture, comprising:
    a flanged nut including a flange and a sleeve extending therefrom;
    a bolt including a substantially planar head and a shaft extending therefrom, the shaft configured to threadably engage the flanged nut to couple the plumbing fixture to a mounting flange;
    a washer configured to be positioned between the bolt and the flanged nut, wherein the washer includes a continuous circumferential ridge extending along the entire perimeter of the washer and defining an internal recess configured to receive the substantially planar head of the bolt; and
    a cap configured to be removably coupled to the washer and to encase the substantially planar head of the bolt between the washer and the cap so as to conceal the substantially planar head from view and to prevent fluid from entering an area between the cap and the washer, wherein the cap includes a cavity defined by a bottom surface and a mating edge, the bottom surface including a planar portion and a perimeter portion, and the mating edge extends along the entire perimeter of the cap and is configured to selectively engage the continuous circumferential ridge of the washer to removably couple the cap to the washer;
    wherein the continuous circumferential ridge includes an outer beveled surface that is complementary to the perimeter portion of the bottom surface, and wherein the continuous circumferential ridge includes a planar surface that is complementary to the mating edge of the cap;
    wherein the mating edge of the cap extends laterally inward toward a center of the cap so as to overlap with the planar surface of the continuous circumferential ridge; and wherein the cap includes a substantially planar top surface opposite the substantially planar bottom surface, wherein the substantially planar bottom surface of the cap is flush with a top surface of the substantially planar head but is otherwise free from the bolt when the cap is removably coupled to the washer with the substantially planar head of the bolt disposed therebetween.

10. The bolt and cap assembly of claim 9, wherein the sleeve of the flanged nut includes a threaded bore, and wherein the shaft of the bolt includes a threaded portion configured to threadably engage at least a portion of the threaded bore to couple the plumbing fixture to the mounting flange.

11. The bolt and cap assembly of claim 9, wherein the mating edge has a profile that is complementary to a profile of the continuous circumferential ridge such that the cap is retained by the washer; and wherein the mating edge surrounds a perimeter of the cap such that the cap and the washer seal off an area between the bottom surface of the cap and the recess of the washer to prevent fluid from entering therebetween.

12. The bolt and cap assembly of claim 9, wherein the continuous circumferential ridge surrounds a peripheral edge of the washer.

13. A bolt and cap assembly for mounting a plumbing fixture, comprising:
   a flanged nut configured to be inserted and retained within a mounting flange, the mounting flange configured to be coupled within an opening of a floor;
   a bolt including a substantially planar head and a shaft extending therefrom, the shaft configured to threadably engage the flanged nut to couple a plumbing fixture to the mounting flange;
   a washer configured to receive the substantially planar head of the bolt with the shaft extending therethrough, wherein the washer includes a continuous circumferential ridge extending along the entire perimeter of the washer and defining an internal recess configured to receive the substantially planar head of the bolt; and
   a cap configured to be removably coupled to the washer with the substantially planar head of the bolt encased therebetween, wherein the cap includes a cavity defined by a bottom surface and a mating edge, the bottom surface including a planar portion and a perimeter portion, and the mating edge extends along the entire perimeter of the cap and is configured to selectively engage the continuous circumferential ridge of the washer to removably couple the cap to the washer;
   wherein the continuous circumferential ridge includes an outer beveled surface that is complementary to the perimeter portion of the bottom surface, and wherein the continuous circumferential ridge includes a planar surface that is complementary to the mating edge of the cap;
   wherein the mating edge of the cap extends laterally inward toward a center of the cap so as to overlap with the planar surface of the continuous circumferential ridge;
   wherein the plumbing fixture is positioned adjacent the mounting flange defining a space therebetween for receiving a portion of the floor;
   wherein the bolt is selectively adjustable relative to the flanged nut to account for variations in floor thickness and to securely couple the plumbing fixture to the mounting flange;
   wherein the cap includes a substantially planar top surface opposite the substantially planar bottom surface; and
   wherein the substantially planar bottom surface of the cap is configured to be flush with a top surface of the substantially planar head but is otherwise free from the bolt.

14. The bolt and cap assembly of claim 13, wherein the cap is further configured to conceal the substantially planar head of the bolt from view and to prevent fluid from entering an area between the cap and the washer by encasing the substantially planar head between the cap and the washer.

15. The bolt and cap assembly of claim 13, wherein the flanged nut includes a sleeve having a threaded bore, and wherein the shaft of the bolt includes a threaded portion configured to threadably engage at least a portion of the threaded bore to couple the plumbing fixture to the mounting flange.

16. The bolt and cap assembly of claim 13, wherein the mating edge has a profile that is complementary to a profile of the circumferential ridge such that the cap is retained by the washer; and wherein the mating edge surrounds the perimeter of the cap such that the cap and the washer seal off an area between the bottom surface of the cap and the recess of the washer to prevent fluid from entering therebetween.

* * * * *